US008604327B2

(12) United States Patent
Takeda

(10) Patent No.: US 8,604,327 B2
(45) Date of Patent: Dec. 10, 2013

(54) APPARATUS AND METHOD FOR AUTOMATIC LYRIC ALIGNMENT TO MUSIC PLAYBACK

(75) Inventor: Haruto Takeda, Tokyo (JP)

(73) Assignee: Sony Corporation, Tokyo (JP)

( * ) Notice: Subject to any disclaimer, the term of this patent is extended or adjusted under 35 U.S.C. 154(b) by 231 days.

(21) Appl. No.: 13/038,768

(22) Filed: Mar. 2, 2011

(65) Prior Publication Data

US 2011/0246186 A1 Oct. 6, 2011

(30) Foreign Application Priority Data

Mar. 31, 2010 (JP) ................................. 2010-083162

(51) Int. Cl.

| | |
|---|---|
| ***G09B 5/00*** | (2006.01) |
| ***G10D 1/08*** | (2006.01) |
| ***G10H 1/00*** | (2006.01) |
| ***A63H 5/00*** | (2006.01) |
| ***G04B 13/00*** | (2006.01) |
| ***G10H 1/36*** | (2006.01) |
| ***G10H 7/00*** | (2006.01) |
| ***G09B 15/00*** | (2006.01) |
| ***G06F 17/28*** | (2006.01) |
| ***G10L 21/00*** | (2013.01) |
| ***G10L 19/00*** | (2013.01) |
| ***G10L 13/00*** | (2006.01) |
| *G10L 13/08* | (2013.01) |
| *G10L 13/06* | (2013.01) |
| *G10L 15/00* | (2013.01) |
| *G10L 15/04* | (2013.01) |
| *G10L 25/00* | (2013.01) |
| *G10L 21/06* | (2013.01) |

(52) U.S. Cl.
USPC ........ 84/601; 434/307 A; 434/307 R; 84/609; 84/610; 84/604; 84/612; 84/477; 704/2; 704/214; 704/201; 704/260; 704/267; 704/275; 704/254; 704/273; 704/270

(58) Field of Classification Search
USPC .............. 704/201, 258, E13.004, 2, 214, 260, 704/267, 275, 254, 273, 270; 84/601, 610, 84/609, 612, 604, 477; 434/307 R, 307 A
See application file for complete search history.

(56) References Cited

U.S. PATENT DOCUMENTS 5,182,414 A * 1/1993 Takahashi ....................... 84/634
5,189,237 A * 2/1993 Koguchi ......................... 84/609

(Continued)

OTHER PUBLICATIONS

Hiromasa Fujihara et al., "Automatic Synchronization Between Musical Audio Signals and Their Lyrics: Vocal Separation and Viterbi Alignment of Vowel Phonemes", Information Processing Society of Japan, IPSJ SIG Technical Report, Aug. 7, 2006, pp. 37-44 (with English Abstract).

(Continued)

*Primary Examiner* — Paras D Shah
*Assistant Examiner* — Anne Thomas-Homescu
(74) *Attorney, Agent, or Firm* — Oblon, Spivak, McClelland, Maier & Neustadt, L.L.P.

(57) ABSTRACT

There is provided an information processing device including a storage unit that stores music data for playing music and lyrics data indicating lyrics of the music, a display control unit that displays the lyrics of the music on a screen, a playback unit that plays the music and a user interface unit that detects a user input. The lyrics data includes a plurality of blocks each having lyrics of at least one character. The display control unit displays the lyrics of the music on the screen in such a way that each block included in the lyrics data is identifiable to a user while the music is played by the playback unit. The user interface unit detects timing corresponding to a boundary of each section of the music corresponding to each displayed block in response to a first user input.

16 Claims, 16 Drawing Sheets

(56) References Cited

U.S. PATENT DOCUMENTS

| | | | | |
|---|---|---|---|---|
| 5,726,372 | A * | 3/1998 | Eventoff et al. | 84/609 |
| 5,751,899 | A * | 5/1998 | Large et al. | 704/207 |
| 5,863,206 | A * | 1/1999 | Narusawa et al. | 434/307 A |
| 7,220,909 | B2 * | 5/2007 | Funaki | 84/609 |
| 8,143,508 | B2 * | 3/2012 | Jean et al. | 84/600 |
| 8,304,642 | B1 * | 11/2012 | Bryan | 84/601 |
| 8,428,955 | B2 * | 4/2013 | Olson | 704/273 |
| 2001/0027396 | A1 * | 10/2001 | Sato | 704/260 |
| 2002/0083818 | A1 * | 7/2002 | Asahi | 84/477 R |
| 2005/0123886 | A1 * | 6/2005 | Hua et al. | 434/307 A |
| 2005/0217462 | A1 * | 10/2005 | Thomson et al. | 84/612 |
| 2006/0015344 | A1 * | 1/2006 | Kemmochi | 704/267 |
| 2007/0044639 | A1 * | 3/2007 | Farbood et al. | 84/609 |
| 2007/0186754 | A1 * | 8/2007 | Cho et al. | 84/610 |
| 2007/0221044 | A1 * | 9/2007 | Orr | 84/609 |
| 2007/0244702 | A1 * | 10/2007 | Kahn et al. | 704/260 |
| 2008/0026355 | A1 * | 1/2008 | Petef | 434/307 A |
| 2008/0097754 | A1 * | 4/2008 | Goto et al. | 704/214 |
| 2008/0195370 | A1 * | 8/2008 | Neubacher et al. | 704/1 |
| 2009/0013855 | A1 * | 1/2009 | Fujishima et al. | 84/604 |
| 2009/0178544 | A1 * | 7/2009 | Reynolds et al. | 84/610 |
| 2010/0100382 | A1 * | 4/2010 | Rao et al. | 704/254 |
| 2010/0257994 | A1 * | 10/2010 | Hufford | 84/609 |
| 2010/0299131 | A1 * | 11/2010 | Lanham et al. | 704/2 |
| 2011/0246186 | A1 * | 10/2011 | Takeda | 704/201 |
| 2012/0312145 | A1 * | 12/2012 | Kellett et al. | 84/613 |

OTHER PUBLICATIONS

Annamaria Mesaros et al., "Automatic Alignment of Music Audio and Lyrics", Proceeding of the 11$^{th}$ International Conference on Digital Audio Effects (DAFx-08), Sep. 1-4, 2008, pp. DAFX-1-DAFX-4.

* cited by examiner

APPARATUS AND METHOD FOR AUTOMATIC LYRIC ALIGNMENT TO MUSIC PLAYBACK

BACKGROUND OF THE INVENTION

1. Field of the Invention

The present invention relates to an information processing device, an information processing method, and a program.

2. Description of the Related Art

Lyrics alignment techniques to temporally synchronize music data for playing music and lyrics of the music have been studied. For example, Hiromasa Fujihara, Masataka Goto et al, "Automatic synchronization between musical audio signals and their lyrics: vocal separation and Viterbi alignment of vowel phonemes", IPSJ SIG Technical Report, 2006-MUS-66, pp. 37-44 propose a technique that segregates vocals from polyphonic sound mixtures by analyzing music data and applies Viterbi alignment to the segregated vocals to thereby determine a position of each part of music lyrics on the time axis. Further, Annamaria Mesaros and Tuomas Virtanen, "Automatic Alignment of Music Audio and Lyrics", Proceeding of the 11th International Conference on Digital Audio Effects (DAFx-08), Sep. 1-4, 2008 propose a technique that segregates vocals by a method different from the method of Fujihara, Goto et al. and applies Viterbi alignment to the segregated vocals. Such lyrics alignment techniques enable automatic alignment of lyrics with music data, or automatic placement of each part of lyrics onto the time axis.

The lyrics alignment techniques may be applied to display of lyrics while playing music in an audio player, control of singing timing in an automatic singing system, control of lyrics display timing in a karaoke system or the like.

SUMMARY OF THE INVENTION

However, in the automatic lyrics alignment techniques according to related art, it has been difficult to place lyrics in appropriate temporal positions with high accuracy for actual music of several ten seconds to several minutes long. For example, the techniques disclosed in Fujihara, Goto et al. and Mesaros and Virtanen achieve a certain degree of alignment accuracy under limited conditions such as limiting the number of target music, providing reading of lyrics in advance, or defining vocal sections in advance. However, such favorable conditions are not always met in actual applied cases.

In several cases where the lyrics alignment techniques are applied, it is not always required to establish synchronization of music data and music lyrics completely automatically. For example, when displaying lyrics while playing music, timely display of lyrics is possible if data which defines lyrics display timing is provided. In this case, what is important to a user is not whether the data which defines lyrics display timing is generated automatically but the accuracy of the data. Therefore, it is effective if the accuracy of alignment can be improved by making alignment of lyrics semi-automatically rather than fully automatically (that is, with the partial support by a user).

For example, as preprocessing of automatic alignment, lyrics of music may be divided into a plurality of blocks, and a user may inform a system of a section of the music to which each block corresponds. After that, the system applies the automatic lyrics alignment technique in a block-by-block manner, which avoids accumulation of deviations of positions of lyrics astride blocks, so that the accuracy of alignment is improved as a whole. It is, however, preferred that such support by a user is implemented through an interface which places as little burden as possible on the user.

In light of the foregoing, it is desirable to provide novel and improved information processing device, information processing method, and program that allow a user to designate a section of music to which each block included in lyrics corresponds with use of an interface which places as little burden as possible on the user.

According to an embodiment of the present invention, there is provided an information processing device including a storage unit that stores music data for playing music and lyrics data indicating lyrics of the music, a display control unit that displays the lyrics of the music on a screen, a playback unit that plays the music and a user interface unit that detects a user input. The lyrics data includes a plurality of blocks each having lyrics of at least one character. The display control unit displays the lyrics of the music on the screen in such a way that each block included in the lyrics data is identifiable to a user while the music is played by the playback unit. The user interface unit detects timing corresponding to a boundary of each section of the music corresponding to each displayed block in response to a first user input.

In this configuration, while music is played, lyrics of the music are displayed on a screen in such a way that each block included in lyrics data of the music is identifiable to a user. Then, in response to a first user input, timing corresponding to a boundary of each section of the music corresponding to each block is detected. Thus, a user merely needs to designate the timing corresponding to a boundary for each block included in the lyrics data while listening to the music played.

The timing detected by the user interface unit in response to the first user input may be playback end timing for each section of the music corresponding to each displayed block.

The information processing device may further include a data generation unit that generates section data indicating start time and end time of the section of the music corresponding to each block of the lyrics data according to the playback end timing detected by the user interface unit.

The data generation unit may determine the start time of each section of the music by subtracting predetermined offset time from the playback end timing.

The information processing device may further include a data correction unit that corrects the section data based on comparison between a time length of each section included in the section data generated by the data generation unit and a time length estimated from a character string of lyrics corresponding to the section.

When a time length of one section included in the section data is longer than a time length estimated from a character string of lyrics corresponding to the one section by a predetermined threshold or more, the data correction unit may correct start time of the one section of the section data.

The information processing device may further include an analysis unit that recognizes a vocal section included in the music by analyzing an audio signal of the music. The data correction unit may set time at a head of a part recognized as being the vocal section by the analysis unit in a section whose start time should be corrected as start time after correction for the section.

The display control unit may control display of the lyrics of the music in such a way that a block for which the playback end timing is detected by the user interface unit is identifiable to the user.

The user interface unit may detect skip of input of the playback end timing for a section of the music corresponding to a target block in response to a second user input.

When the user interface unit detects skip of input of the playback end timing for a first section, the data generation unit may associate start time of the first section and end time of a second section subsequent to the first section with a character string into which lyrics corresponding to the first section and lyrics corresponding to the second section are combined, in the section data.

The information processing device may further include an alignment unit that executes alignment of lyrics using each section and a block corresponding to the section with respect to each section indicated by the section data.

According to another embodiment of the present invention, there is provided an information processing method using an information processing device including a storage unit that stores music data for playing music and lyrics data indicating lyrics of the music, the lyrics data including a plurality of blocks each having lyrics of at least one character, the method including steps of playing the music, displaying the lyrics of the music on a screen in such a way that each block of the lyrics data is identifiable to a user while the music is played, and detecting timing corresponding to a boundary of each section of the music corresponding to each displayed block in response to a first user input.

According to another embodiment of the present invention, there is provided a program causing a computer that controls an information processing device including a storage unit that stores music data for playing music and lyrics data indicating lyrics of the music to function as a display control unit that displays the lyrics of the music on a screen, a playback unit that plays the music, and a user interface unit that detects a user input. The lyrics data includes a plurality of blocks each having lyrics of at least one character. The display control unit displays the lyrics of the music on the screen in such a way that each block included in the lyrics data is identifiable to a user while the music is played by the playback unit. The user interface unit detects timing corresponding to a boundary of each section of the music corresponding to each displayed block in response to a first user input.

According to the embodiments of the present invention described above, it is possible to provide the information processing device, information processing method, and program that allow a user to designate a section of music to which each block included in lyrics corresponds with use of an interface which places as little burden as possible on the user.

DETAILED DESCRIPTION OF THE EMBODIMENT(S)

Figure 1:
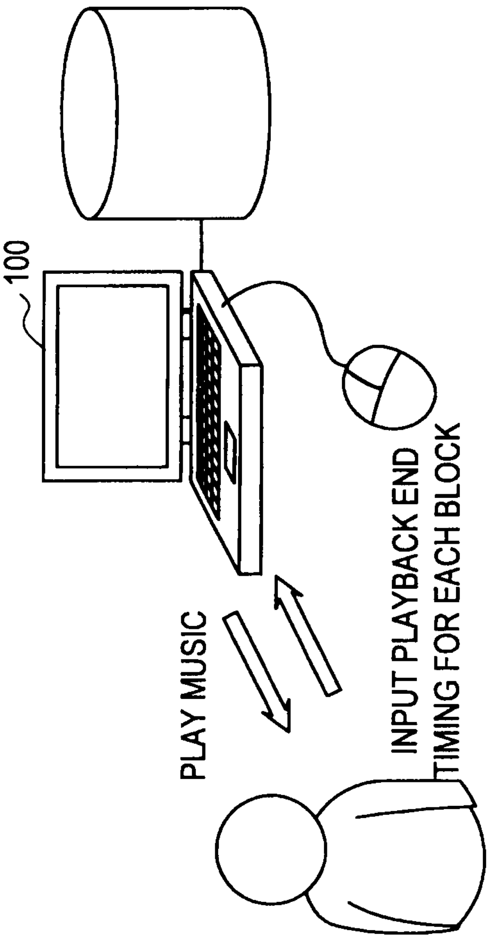
FIG. 1 is a schematic view showing an overview of an information processing device according to one embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order.

1. Overview of Information Processing Device
2. Exemplary Configuration of Information Processing Device
 2-1. Storage Unit
 2-2. Playback Unit
 2-3. Display Control Unit
 2-4. User Interface Unit
 2-5. Data Generation Unit
 2-6. Analysis Unit
 2-7. Data Correction Unit
 2-8. Alignment Unit
3. Flow of Semi-Automatic Alignment Process
 3-1. Overall Flow
 3-2. User Operation
 3-3. Detection of Playback End Timing
 3-4. Section Data Generation Process
 3-5. Section Data Correction Process
4. Modification of Section Data by User
5. Modification of Alignment Data
6. Summary <1. Overview of Information Processing Device>

An overview of an information processing device according to one embodiment of the present invention is described hereinafter with reference to FIG. 1. FIG. 1 is a schematic view showing an overview of an information processing device 100 according to one embodiment of the present invention.

In the example of FIG. 1, the information processing device 100 is a computer that includes a storage medium, a screen, and an interface for a user input. The information processing device 100 may be a general-purpose computer such as a PC (Personal Computer) or a work station, or a computer of another type such as a smart phone, an audio player or a game machine. The information processing device 100 plays music stored in the storage medium and displays an input screen, which is described in detail later, on the screen. While listening to the music played by the information processing device 100, a user inputs timing at which playback of each block ends with respect to each block separating lyrics of the music. The information processing device 100 recognizes a section of the music corresponding to each block of the lyrics in response to such a user input and executes alignment of the lyrics for each recognized section.

<2. Exemplary Configuration of Information Processing Device>

Figure 2:
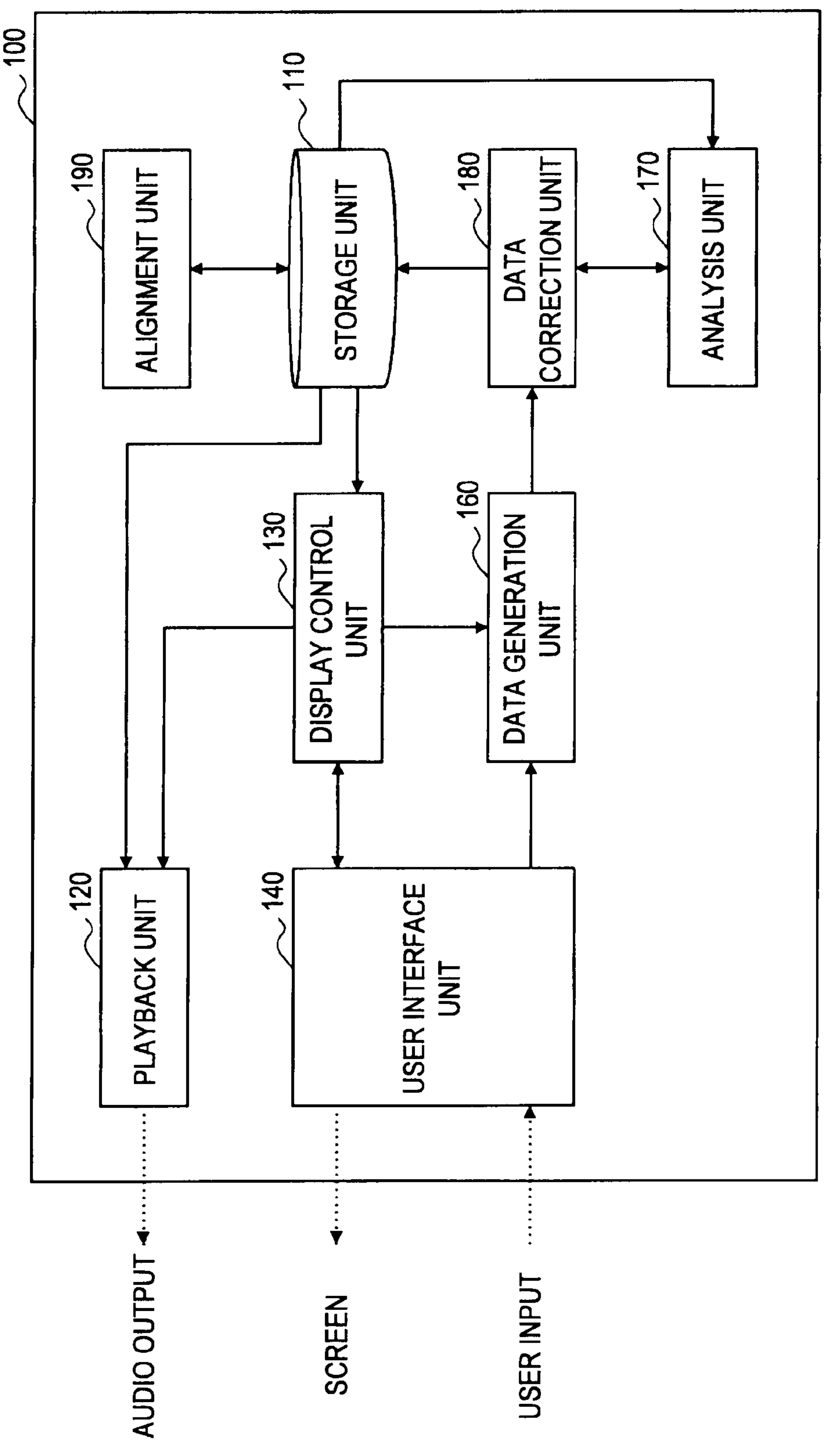
FIG. 2 is a block diagram showing an example of a configuration of an information processing device according to one embodiment.

A detailed configuration of the information processing device 100 shown in FIG. 1 is described hereinafter with reference to FIGS. 2 to 7. FIG. 2 is a block diagram showing an example of a configuration of the information processing device 100 according to the embodiment. Referring to FIG. 2, the information processing device 100 includes a storage unit 110, a playback unit 120, a display control unit 130, a user interface unit 140, a data generation unit 160, an analysis unit 170, a data correction unit 180, and an alignment unit 190.

[2-1. Storage Unit]

The storage unit 110 stores music data for playing music and lyrics data indicating lyrics of the music by using a storage medium such as hard disk or semiconductor memory. The music data stored in the storage unit 110 is audio data of music for which semi-automatic alignment of lyrics is made by the information processing device 100. A file format of the music data may be arbitrary format such as WAVE, MP3 (MPEG Audio Layer-3) or AAC (Advanced Audio Coding). On the other hand, the lyrics data is typically text data indicating lyrics of music.

Figure 3:
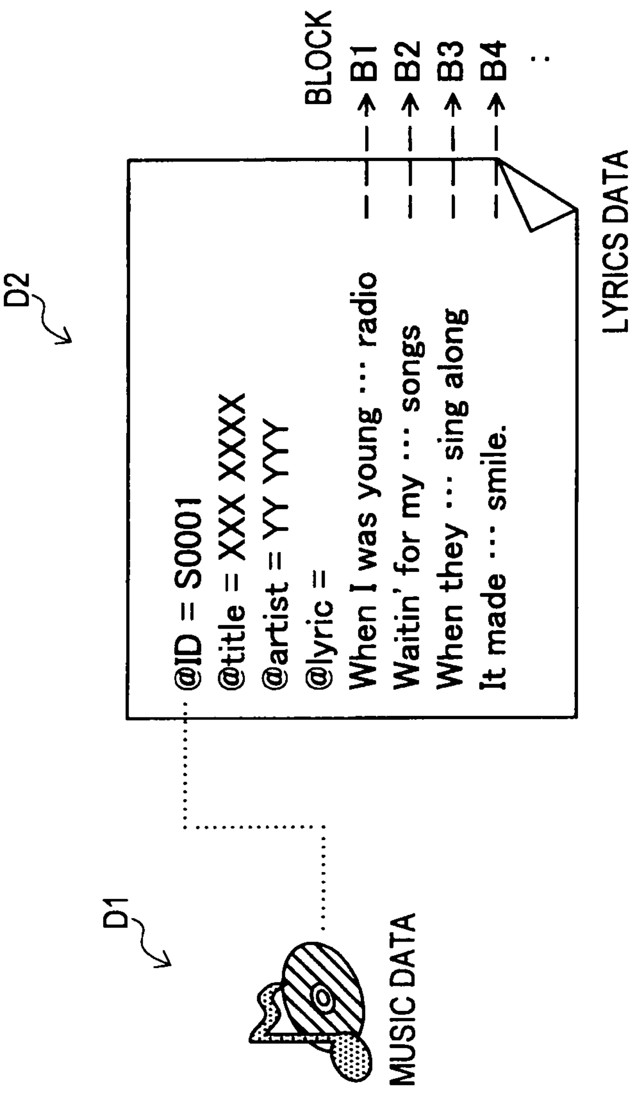
FIG. 3 is an explanatory view to explain lyrics data according to one embodiment.

FIG. 3 is an explanatory view to explain lyrics data according to the embodiment. Referring to FIG. 3, an example of lyrics data D2 to be synchronized with music data D1 is shown.

In the example of FIG. 3, the lyrics data D2 has four data items with symbol "@". A first data item is ID ("ID"="S0001") for identifying music data to be synchronized with the lyrics data D2. A second data item is a title ("title"="XXX XXXX") of music. A third data item is an artist name ("artist"="YY YYY") of music. A fourth data item is lyrics ("lyric") of music. In the lyrics data D2, lyrics are divided into a plurality of records by line feed. In this specification, each of the plurality of records is referred to as a block of lyrics. Each block has lyrics of at least one character. Thus, the lyrics data D2 may be regarded as data that defines a plurality of blocks separating lyrics of music. In the example of FIG. 3, the lyrics data D2 includes four (lyrics) blocks B1 to B4. Note that, in the lyrics data, a character or a symbol other than a line feed character may be used to divide lyrics into blocks.

The storage unit 110 outputs the music data to the playback unit 120 and outputs the lyrics data to the display control unit 130 at the start of playing music. Then, after a section data generation process, which is described later, is performed, the storage unit 110 stores generated section data. The detail of the section data is specifically described later. The section data stored in the storage unit 110 is used for automatic alignment by the alignment unit 190.

[2-2. Playback Unit]

The playback unit 120 acquires the music data stored in the storage unit 110 and plays the music. The playback unit 120 may be a typical audio player capable of playing an audio data file. The playback of music by the playback unit 120 is started in response to an instruction from the display control unit 130, which is described next, for example.

[2-3. Display Control Unit]

When an instruction to start playback of music from a user is detected in the user interface unit 140, the display control unit 130 gives an instruction to start playback of the designated music to the playback unit 120. Further, the display control unit 130 includes an internal timer and counts elapsed time from the start of playback of music. Furthermore, the display control unit 130 acquires the lyrics data of the music to be played by the playback unit 120 from the storage unit 110 and displays lyrics included in the lyrics data on a screen provided by the user interface unit 140 in such a way that each block of the lyrics is identifiable to the user while the music is played by the playback unit 120. The time indicated by the timer of the display control unit 130 is used for recognition of playback end timing for each section of the music detected by the user interface unit 140, which is described next.

[2-4. User Interface Unit]

The user interface unit 140 provides an input screen for a user to input timing corresponding to a boundary of each section of music. In this embodiment, the timing corresponding to a boundary which is detected by the user interface unit 140 is playback end timing of each section of music. The user interface unit 140 detects the playback end timing of each section of the music which corresponds to each block displayed on the input screen in response to a first user input like an operation of a given button (e.g. clicking or tapping, or pressing of a physical button etc.), for example. The playback end timing of each section of the music which is detected by the user interface unit 140 is used for generation of section data by the data generation unit 160, which is described later. Further, the user interface unit 140 detects skip of input of the playback end timing for a section of the music corresponding to a target block in response to a second user input like an operation of a given button different from the above-described button, for example. For a section of the music for which skip is detected by the user interface unit 140, the information processing device 100 omits recognition of end time of the section.

Figure 4:
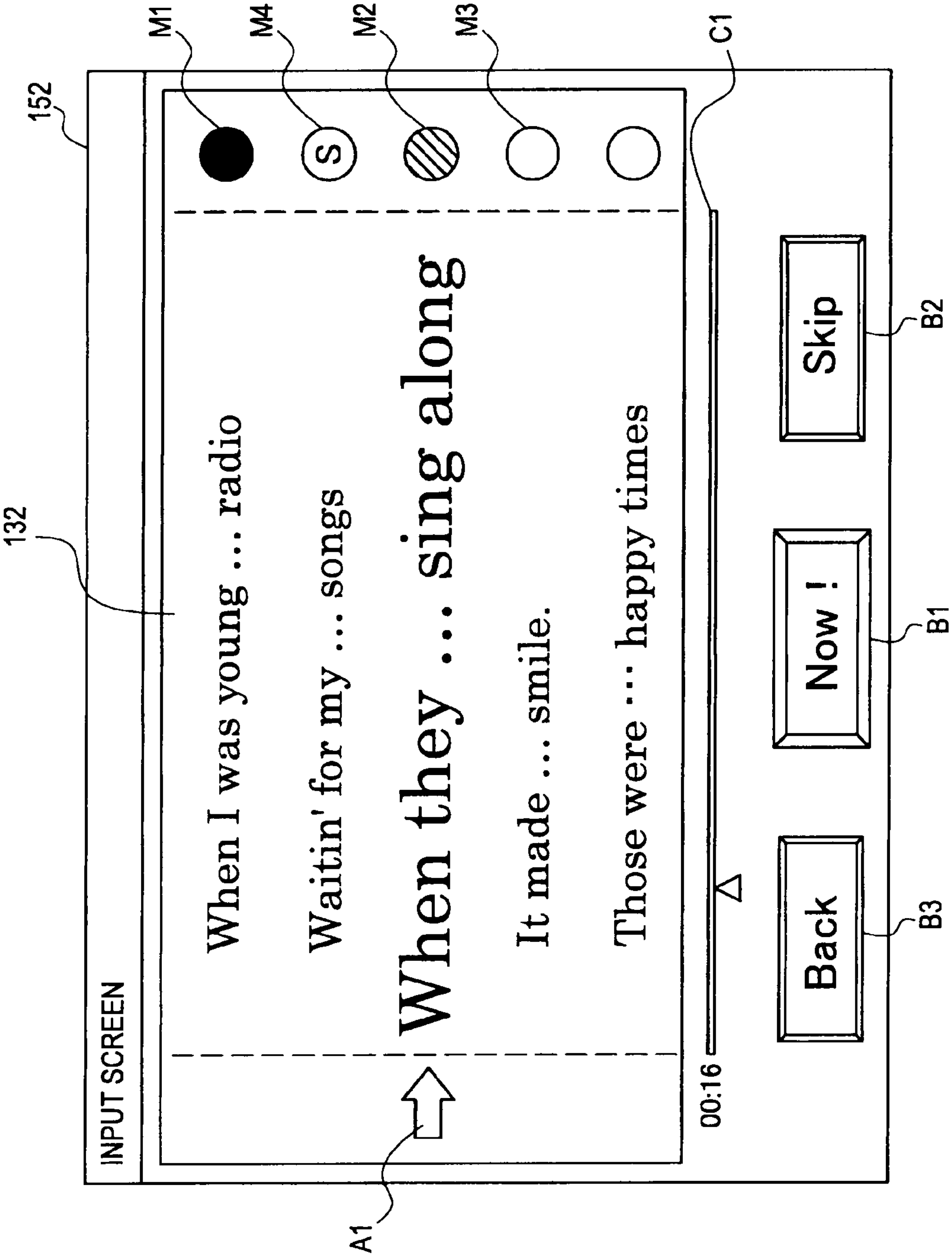
FIG. 4 is an explanatory view to explain an example of an input screen displayed according to one embodiment.

FIG. 4 is an explanatory view to explain an example of an input screen which is displayed by the information processing device 100 according to the embodiment. Referring to FIG. 4, an input screen 152 is shown as an example.

At the center of the input screen 152 is a lyrics display area 132. The lyrics display area 132 is an area which the display control unit 130 uses to display lyrics. In the example of FIG. 4, in the lyrics display area 132, the respective blocks of lyrics included in the lyrics data are displayed in different rows. A user can thereby differentiate among the blocks of the lyrics data. Further, in the display control unit 130, a target block for which the playback end timing is to be input next is displayed highlighted with a larger font size compared to the other blocks. Note that the display control unit 130 may change the color of text, background color, style or the like, instead of changing the font size, to highlight the target block. At the left of the lyrics display area 132, an arrow A1 pointing to the target block is displayed. Further, at the right of the lyrics display area 132, marks indicating the input status of the playback end timing for the respective blocks are displayed. For example, a mark M1 is a mark for identifying a block in which the playback end timing is detected by the user interface unit 140 (that is, a block in which input of the playback end timing is made by a user). A mark M2 is a mark for identifying a target bock in which the playback end timing is to be input next. A mark M3 is a mark for identifying a block in which the playback end timing is not yet detected by the user interface unit 140. A mark M4 is a mark for identifying a block in which skip is detected by the user interface unit 140. The display control unit 130 may scroll up such display of lyrics in the lyrics display area 132 according to input of the playback end timing by a user, for example, and control the display so that the target block in which the playback end timing is to be input next is always shown at the center in the vertical direction.

At the bottom of the input screen 152 are three buttons B1, B2 and B3. The button B1 is a timing designation button for a user to designate the playback end timing for each section of music corresponding to each block displayed in the lyrics display area 132. For example, when a user operates the timing designation button B1, the user interface unit 140 refers to the above-described timer of the display control unit 130 and stores the playback end timing for a section corresponding to the block pointed by the arrow A1. The button B2 is a skip button for a user to designate skip of input of the playback end timing for a section of music corresponding to the block of interest (target block). For example, when a user operates the skip button B2, the user interface unit 140 notifies the display control unit 130 that input of the playback end timing is to be skipped. Then, the display control unit 130 scrolls up the display of lyrics in the lyrics display area 132, highlights the next block and places the arrow A1 at the next block, and further changes the mark of the skipped block to the mark M4. The button B3 is a back button for a user to designate input of the playback end timing to be made once again for the previous block. For example, when a user operates the back button B3, the user interface unit 140 notifies the display control unit 130 that the back button B3 is operated. Then, the display control unit 130 scrolls down the display of lyrics in the lyrics display area 132, highlights the previous block and places the arrow A1 and the mark M2 at the newly highlighted block.

Note that the buttons B1, B2 and B3 may be implemented using physical buttons equivalent to given keys (e.g. Enter key) of a keyboard or a keypad, for example, rather than implemented as GUI (Graphical User Interface) on the input screen 152 as in the example of FIG. 4.

A time line bar C1 is displayed between the lyrics display area 132 and the buttons B1, B2 and B3 on the input screen 152. The time line bar C1 displays the time indicated by the timer of the display control unit 130 which is counting elapsed time from the start of playback of music.

Figure 5:
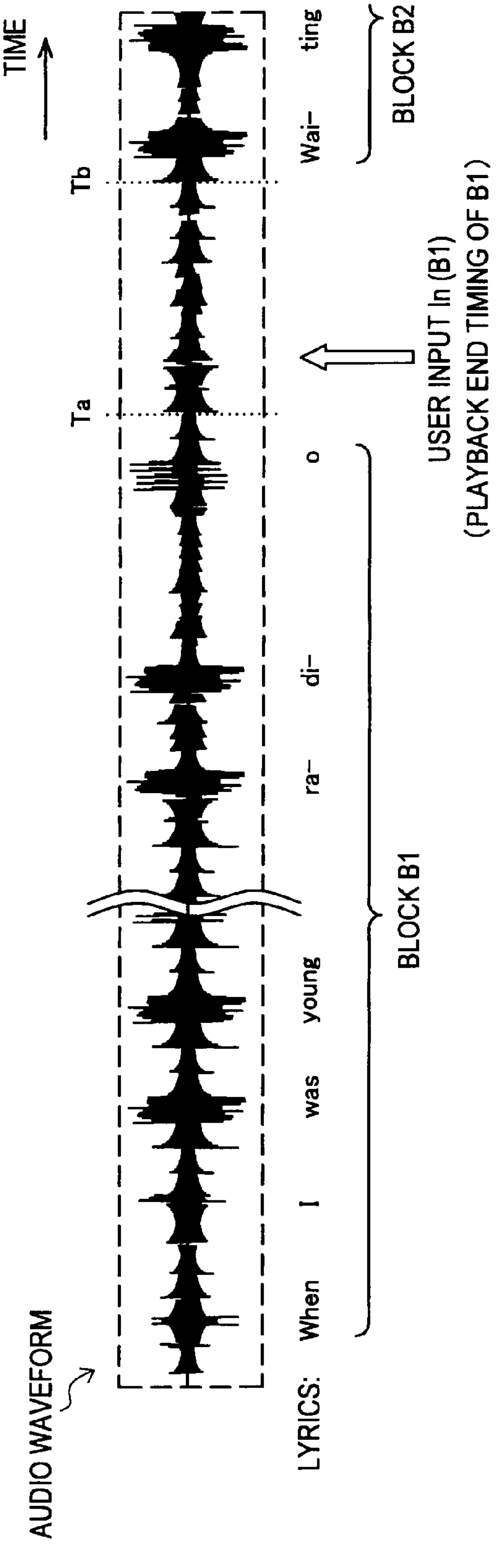
FIG. 5 is an explanatory view to explain timing detected in response to a user input according to one embodiment.

FIG. 5 is an explanatory view to explain timing detected in response to a user input according to the embodiment. Referring to FIG. 5, an example of an audio waveform of music played by the playback unit 120 is shown along the time axis. Below the audio waveform, lyrics which a user can recognize by listening in the audio at each point of time are shown.

In the example of FIG. 5, playback of the section corresponding to the block B1 ends by time Ta. Further, playback of the section corresponding to the block B2 starts at time Tb. Therefore, a user who operates the input screen 152 described above with reference to FIG. 4 operates the timing designation button B1 during the period from the time Ta to the time Tb, while listening to the music being played. The user interface unit 140 thereby detects the playback end timing for the block B1 and stores time of the detected playback end timing. Then, the playback of each section of the music and the detection of the playback end timing for each block are repeated all over the music, and the user interface unit 140 thereby acquires a list of the playback end timing for the respective blocks of the lyrics. The user interface unit 140 outputs the list of the playback end timing to the data generation unit 160.

[2-5. Data Generation Unit]

The data generation unit 160 generates section data indicating start time and end time of a section of the music corresponding to each block of the lyrics data according to the playback end timing detected by the user interface unit 140.

Figure 6:
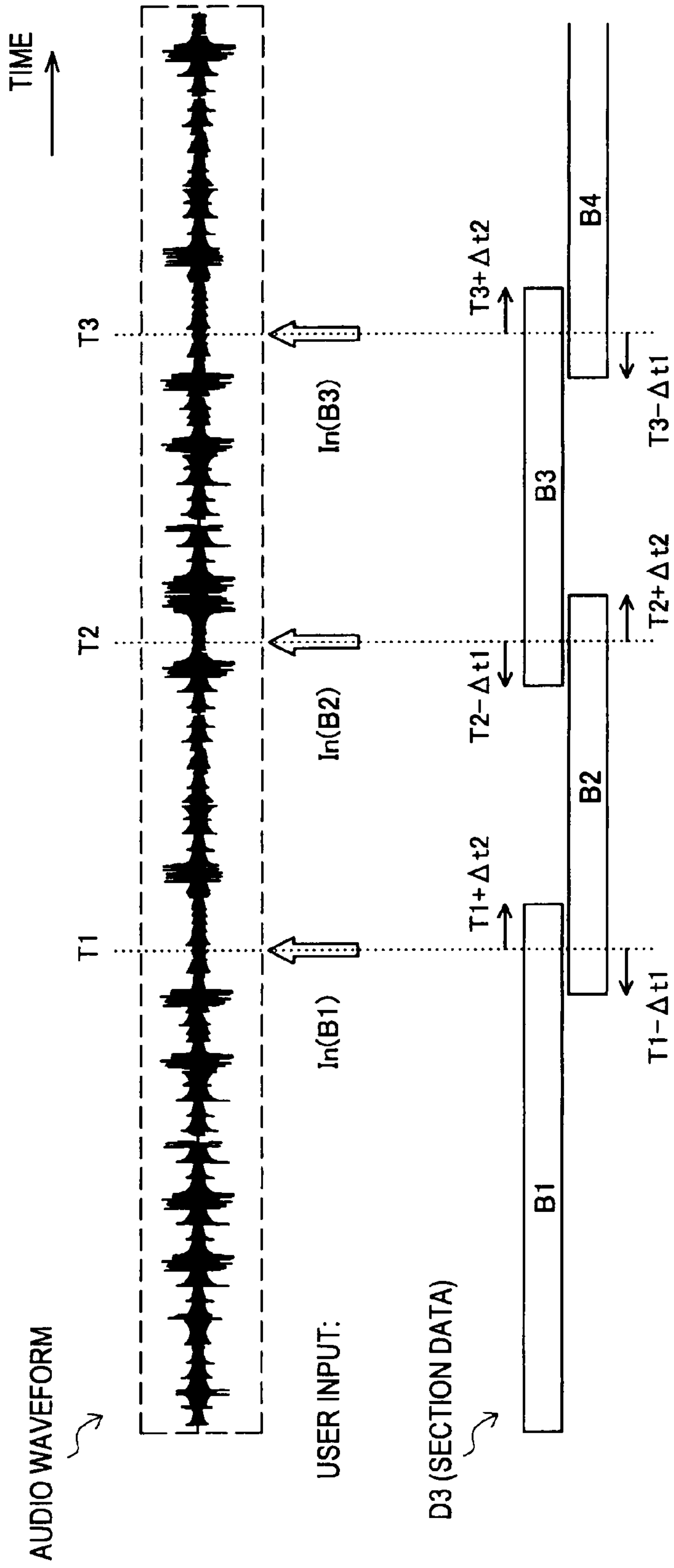
FIG. 6 is an explanatory view to explain a section data generation process according to one embodiment.

FIG. 6 is an explanatory view to explain a section data generation process by the data generation unit 160 according to the embodiment. In the upper part of FIG. 6, an example of an audio waveform of music which is played by the playback unit 120 is shown again along the time axis. In the middle part of FIG. 6, playback end timing In(B1) for the block B1, playback end timing In(B2) for the block B2 and playback end timing In(B3) for the block B3 which are respectively detected by the user interface unit 140 are shown. Note that In(B1)=T1, In(B2)=T2, and In(B3)=T3. Further, in the lower part of FIG. 6, start time and end time of each section which are determined according to the playback end timing are shown using a box of each section.

As described earlier with reference to FIG. 5, the playback end timing detected by the user interface unit 140 is timing at which playback of music ends for each block of lyrics. Thus, the timing when playback of music starts for each block of lyrics is not included in the list of the playback end timing which is input to the data generation unit 160 from the user interface unit 140. The data generation unit 160 therefore determines start time of a section corresponding to one given block according to the playback end timing for the immediately previous block. Specifically, the data generation unit 160 sets time obtained by subtracting a predetermined offset time from the playback end timing for the immediately previous block as the start time of the section corresponding to the above-described one given block. In the example of FIG. 6, the start time of the section corresponding to the block B2 is "T1-Δt1", which is obtained by subtracting the offset time Δt1 from the playback end timing T1 for the block B1. The start time of the section corresponding to the block B3 is "T2-Δt1", which is obtained by subtracting the offset time Δt1 from the playback end timing T2 for the block B2. The start time of the section corresponding to the block B4 is "T3-Δt1", which is obtained by subtracting the offset time Δt1 from the playback end timing T3 for the block B3. In this manner, the time obtained by subtracting a predetermined offset time from the playback end timing is set as the start time of each section because there is a possibility that playback of the next section has already started at the point of time when a user operates the timing designation button B1.

On the other hand, the possibility that playback of the target section has not yet ended at the point of time when a user operates the timing designation button B1 is low. However, there is a possibility that a user performs an operation at the point of time when the waveform of the last phoneme of lyrics corresponding to the target section has not completely ended, for example, in addition to a case where a user performs a wrong operation. Therefore, for the end time of each section as well, the data generation unit 160 performs offset processing in the same manner as for the start time. Specifically, the data generation unit 160 sets time obtained by adding a predetermined offset time to the playback end timing for a given block as the end time of the section corresponding to the block. In the example of FIG. 6, the end time of the section corresponding to the block B1 is "T1+Δt2", which is obtained by adding the offset time Δt2 to the playback end timing T1 for the block B1. The end time of the section corresponding to the block B2 is "T2+Δt2", which is obtained by adding the offset time Δt2 to the playback end timing T2 for the block B2. The end time of the section corresponding to the block B3 is "T3+Δt2", which is obtained by adding the offset time Δt2 to the playback end timing T3 for the block B3. Note that the values of the offset time Δt1 and Δt2 may be predefined as fixed values or determined dynamically according to the length of lyrics character string, the number of beats or the like of each block. Further, the offset time Δt2 may be zero.

The data generation unit 160 determines start time and end time of a section corresponding to each block of lyrics data in the above manner and generates section data indicating the start time and the end time of each section.

Figure 7:
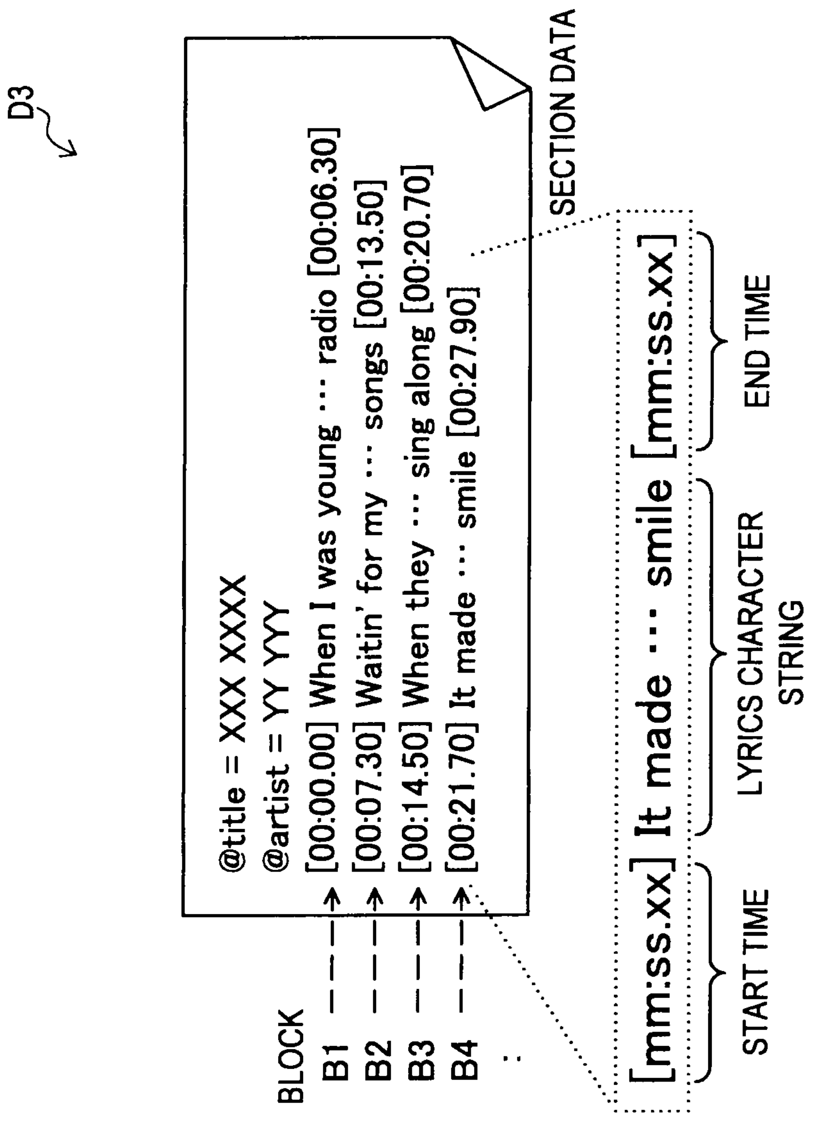
FIG. 7 is an explanatory view to explain section data according to one embodiment.

FIG. 7 is an explanatory view to explain section data generated by the data generation unit 160 according to the embodiment. Referring to FIG. 7, section data D3 is shown as an example which is described in LRC format, which is widely used in spite of not being a standardized format.

In the example of FIG. 7, the section data D3 has two data items with symbol "@". A first data item is a title ("title"="XXX XXXX") of music. A second data item is an artist name ("artist"="YY YYY") of music. Further, start time, lyrics character string and end time of each section corresponding to each block of lyrics data are recorded for each record below the two data items. The start time and the end time of each section have a format of "[mm:ss.xx]" and represents elapsed time from the start time of music to the relevant time using minutes (mm) and seconds (ss.xx).

Note that, when skip of input of playback end timing is detected by the user interface unit 140 for a given section, the data generation unit 160 associates a pair of the start time of the given section and the end time of a section subsequent to the given section with a lyrics character string corresponding to those two sections (i.e. a character string into which lyrics respectively corresponding to the two sections are combined). For example, in the example of FIG. 7, when input of the playback end timing for the block B1 is skipped, the section data D3 may be generated which includes the start time [00:00.00] of the block B1, the lyrics character string "When I was young . . . songs" corresponding to the blocks B1 and B2, and the end time [00:13.50] of the block B2 in one record.

The data generation unit 160 outputs the section data generated by the above-described section data generation process to the data correction unit 180.

[2-6. Analysis Unit]

The analysis unit 170 analyzes an audio signal included in music data and thereby recognizes a vocal section included in music. The process of analyzing the audio signal by the analysis unit 170 may be a process on the basis of a known technique, such as detection of a voiced section (i.e. vocal section) from an input acoustic signal based on analysis of a power spectrum disclosed in Japanese Domestic Re-Publication of PCT Publication No. WO2004/111996, for example. Specifically, the analysis unit 170 partially extracts the audio signal included in music data for a section whose start time should be corrected in response to an instruction from the data correction unit 180, which is described next, and analyzes the power spectrum of the extracted audio signal. Then, the analysis unit 170 recognizes the vocal section included in the section using the analysis result of the power spectrum. After that, the analysis unit 170 outputs time data specifying the boundaries of the recognized vocal section to the data correction unit 180.

[2-7. Data Correction Unit]

Most of music in general includes both a vocal section during which a singer is singing and a non-vocal section other than the vocal section (in this specification, no consideration is given to music which does not include the vocal section because it is not a target of lyrics alignment). For example, a prelude section and an interlude section are examples of the non-vocal section. In the input screen 152 described above with reference to FIG. 4, a user designates only the playback end timing for each block, and therefore the user interface unit 140 does not detect the boundary between the prelude section or the interlude section and the subsequent vocal section. However, in the section data, if a long non-vocal section is included in one section, that causes degradation of accuracy of alignment of subsequent lyrics. In view of this, the data correction unit 180 corrects the section data generated by the data generation unit 160 as described below. The correction of the section data by the data correction unit 180 is performed based on comparison between a time length of each section included in the section data generated by the data generation unit 160 and a time length estimated from a character string of lyrics corresponding to the section.

Specifically, with respect to a record of each section included in the section data D3 described above with reference to FIG. 7, the data correction unit 180 first estimates time required to play a lyrics character string corresponding to the section. For example, it is assumed that average time $T_w$ required to play one word included in lyrics in typical music is known. In this case, the data correction unit 180 can estimate time required to play a lyrics character string of each block by multiplying the number of words included in the lyrics character string of each block by the known average time $T_w$. Note that, instead of the average time $T_w$ required to play one word, average time required to play one character or one phoneme may be known.

Next, it is assumed that a time length equivalent to a difference between start time and end time of a given section included in the section data is longer than a time length estimated from a lyrics character string by the above technique by a predetermined threshold (e.g. several seconds to over ten seconds) or more (hereinafter, such a section is referred to as a correction target section). In this case, the data correction unit 180 corrects the start time of the correction target section included in the section data to time at the head of the part recognized as being the vocal section by the analysis unit 170 in the correction target section. A relatively long non-vocal period such as a prelude section or an interlude section is thereby eliminated from the range of each section included in the section data.

Figure 8:
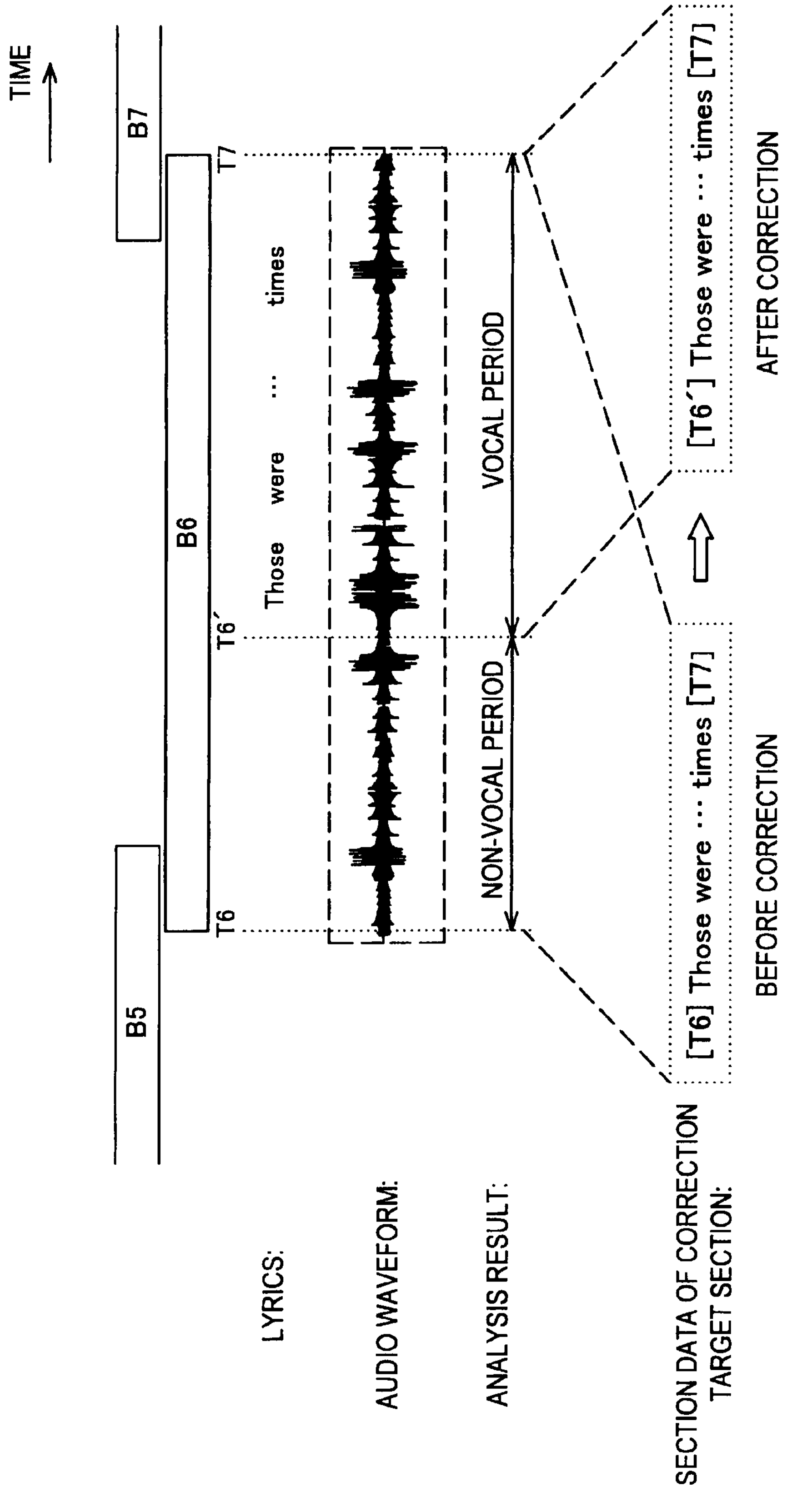
FIG. 8 is an explanatory view to explain correction of section data according to one embodiment.

FIG. 8 is an explanatory view to explain correction of section data by the data correction unit 180 according to the embodiment. In the upper part of FIG. 8, a section for the block B6 included in the section data generated by the data generation unit 160 is shown using a box. Start time of the section is T6, and end time is T7. Further, a lyrics character string of the block B6 is "Those were . . . times". In such an example, the data correction unit 180 compares the time length (=T7−T6) of the section for the block B6 and the time length estimated from the lyrics character string "Those were . . . times" of the block B6. When the former is longer than the latter by a predetermined threshold or more, the data correction unit 180 recognizes the section as the correction target section. Then, the data correction unit 180 makes the analysis unit 170 analyze an audio signal of the correction target section and specifies a vocal section included in the correction target section. In the example of FIG. 8, the vocal section is a section from time T6' to time T7. As a result, the data correction unit 180 corrects the start time for the correction target section included in the section data generated by the data generation unit 160 from T6 to T6'. The data correction unit 180 stores the section data corrected in this manner for each section recognized as the correction target section into the storage unit 110.

[2-8. Alignment Unit]

The alignment unit 190 acquires the music data, the lyrics data, and the section data corrected by the data correction unit 180 for music serving as a target of lyrics alignment from the storage unit 110. Then, the alignment unit 190 executes alignment of lyrics by using each section and a block corresponding to the section with respect to each section represented by the section data. Specifically, the alignment unit 190 applies the automatic lyrics alignment technique disclosed in Fujihara, Goto et al. or Mesaros and Virtanen described above, for example, for each pair of a section of music represented by the section data and a block of lyrics. The accuracy of alignment is thereby improved compared to the case of applying the lyrics alignment techniques to a pair of whole music and whole lyrics of the music. A result of the alignment by the alignment unit 190 is stored into the storage unit 110 as alignment data in LRC format, which is described earlier with reference to FIG. 7, for example.

Figure 9A:
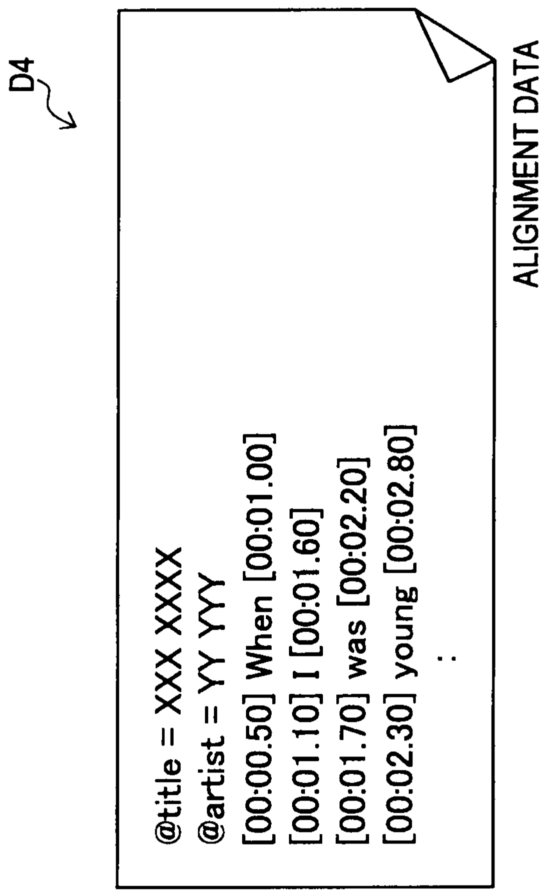
FIG. 9A is a first explanatory view to explain a result of alignment according to one embodiment.
Figure 9B:
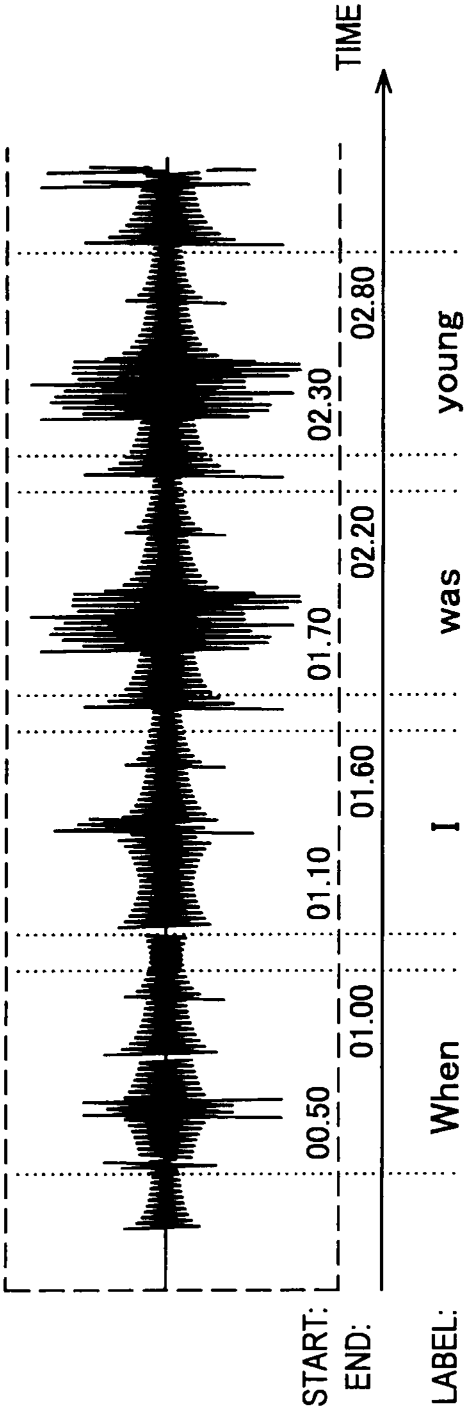
FIG. 9B is a second explanatory view to explain a result of alignment according to one embodiment.

FIGS. 9A and 9B are explanatory views to explain a result of alignment by the alignment unit 190 according to the embodiment.

Referring to FIG. 9A, alignment data D4 is shown as an example generated by the alignment unit 190. In the example of FIG. 9A, the alignment data D4 includes a title of music and an artist name, which are two data items being the same as those of the section data D3 shown in FIG. 7. Further, start time, label (lyrics character string) and end time for each word included in lyrics are recorded for each record below those two data items. The start time and the end time of each label have a format of "[mm:ss.xx]". The alignment data D4 may be used for various applications, such as display of lyrics while playing music in an audio player or control of singing timing in an automatic singing system. Referring to FIG. 9B, the alignment data D4 illustrated in FIG. 9A is visualized together with an audio waveform along the time axis. Note that, when lyrics of music is Japanese, for example, alignment data may be generated with one character as one label, rather than one word as one label.

<3. Flow of Semi-Automatic Alignment Process>

Hereinafter, a flow of a semi-automatic alignment process which is performed by the above-described information processing device 100 is described with reference to FIGS. 10 to 14.

[3-1. Overall Flow]

Figure 10:
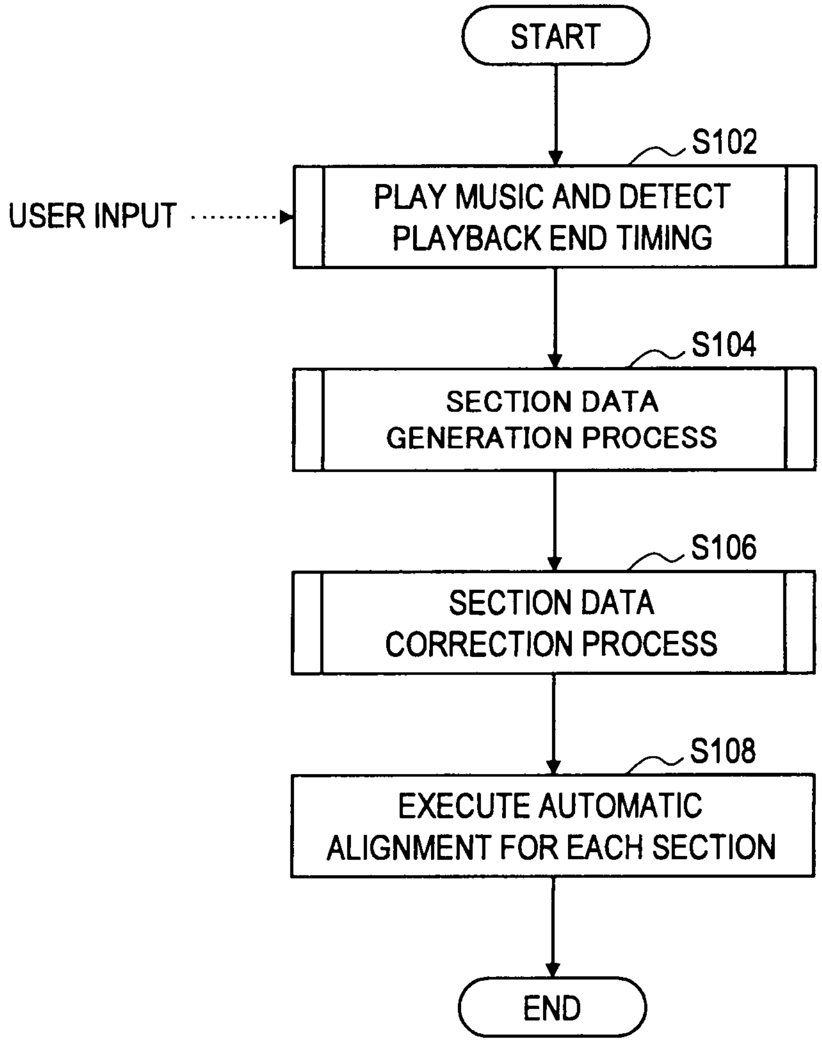
FIG. 10 is a flowchart showing an example of a flow of a semi-automatic alignment process according to one embodiment.

FIG. 10 is a flowchart showing an example of a flow of a semi-automatic alignment process according to the embodiment. Referring to FIG. 10, the information processing device 100 first plays music and detects playback end timing for each section corresponding to each block included in lyrics of the music in response to a user input (step S102). A flow of the detection of playback end timing in response to a user input is further described later with reference to FIGS. 11 and 12.

Next, the data generation unit 160 of the information processing device 100 performs the section data generation process, which is described earlier with reference to FIG. 6, according to the playback end timing detected in the step S102 (step S104). A flow of the section data generation process is further described later with reference to FIG. 13.

Then, the data correction unit 180 of the information processing device 100 performs the section data correction process, which is described earlier with reference to FIG. 8 (step S106). A flow of the section data correction process is further described later with reference to FIG. 14.

After that, the alignment unit 190 of the information processing device 100 executes automatic lyrics alignment for each pair of a section of music indicated by the corrected section data and lyrics (step S108).

[3-2. User Operation]

Figure 11:
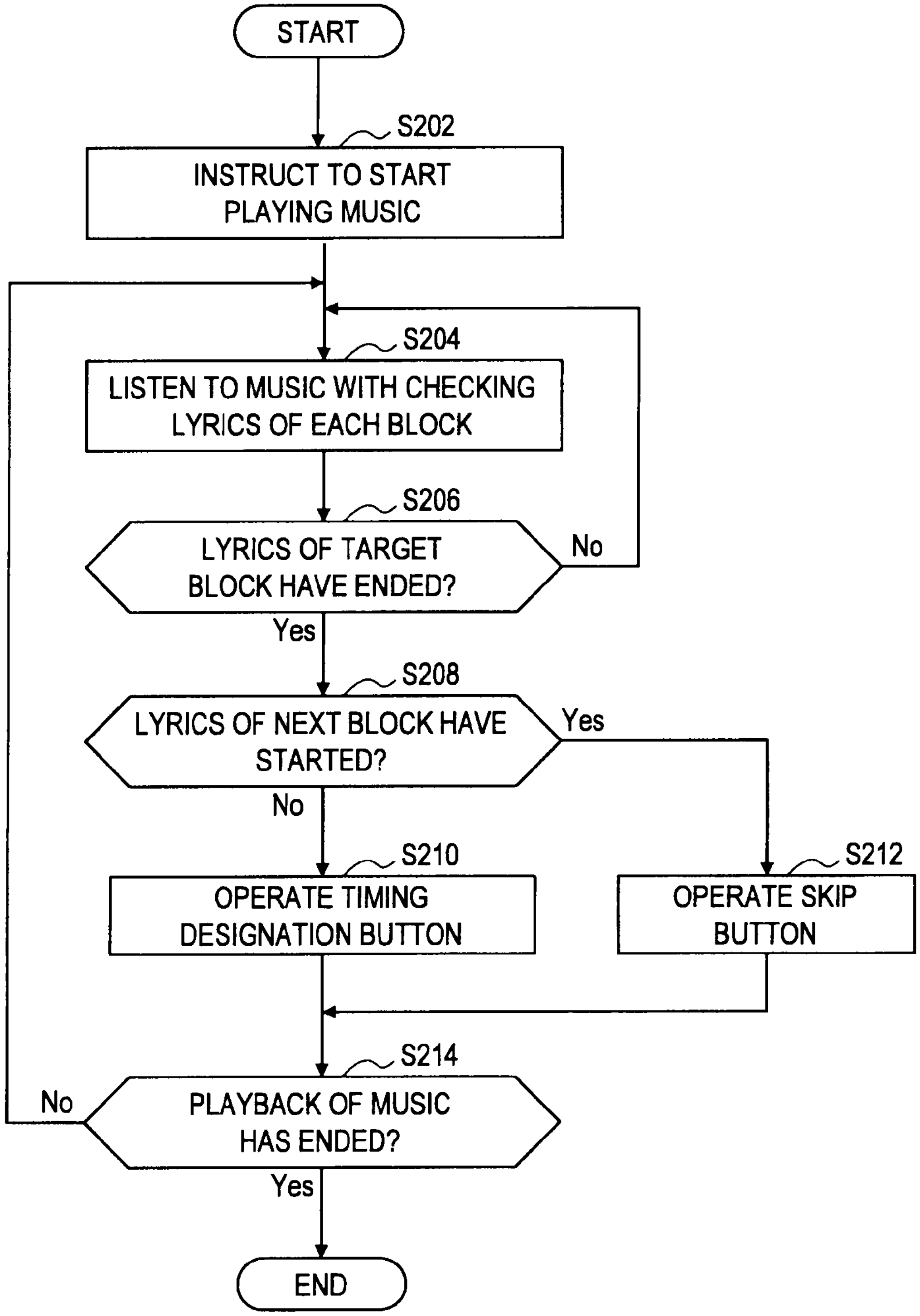
FIG. 11 is a flowchart showing an example of a flow of an operation to be performed by a user according to one embodiment.

FIG. 11 is a flowchart showing an example of a flow of an operation to be performed by a user in the step S102 of FIG. 10. Note that because a case where the back button B3 is operated by a user is exceptional, such processing is not illustrated in the flowchart of FIG. 11. The same applies to FIG. 12.

Referring to FIG. 11, a user first gives an instruction to start playing music to the information processing device 100 by operating the user interface unit 140 (step S202). Next, the user listens to the music played by the playback unit 120 with checking lyrics of each block displayed on the input screen 152 of the information processing device 100 (step S204). Then, the user monitors the end of playback of lyrics of a block highlighted on the input screen 152 (which is referred to hereinafter as a target block) (step S206). The monitoring by the user continues unless playback of lyrics of the target block ends.

Upon determining that playback of lyrics of the target block ends, the user operates the user interface unit 140. Generally, the operation by the user is performed after playback of lyrics of the target block ends and before playback of lyrics of the next block starts (No in step S208). In this case, the user operates the timing designation button B1 (step S210). The playback end timing for the target block is thereby detected by the user interface unit 140. On the other hand, upon determining that playback of lyrics of the next block has already started (Yes in step S208), the user operates the skip button B2 (step S212). In this case, the target block shifts to the next block without detection of the playback end timing for the target block.

Such designation of the playback end timing by the user is repeated until playback of the music ends (step S214). When playback of the music ends, the operation by the user ends.

[3-3. Detection of Playback End Timing]

Figure 12:
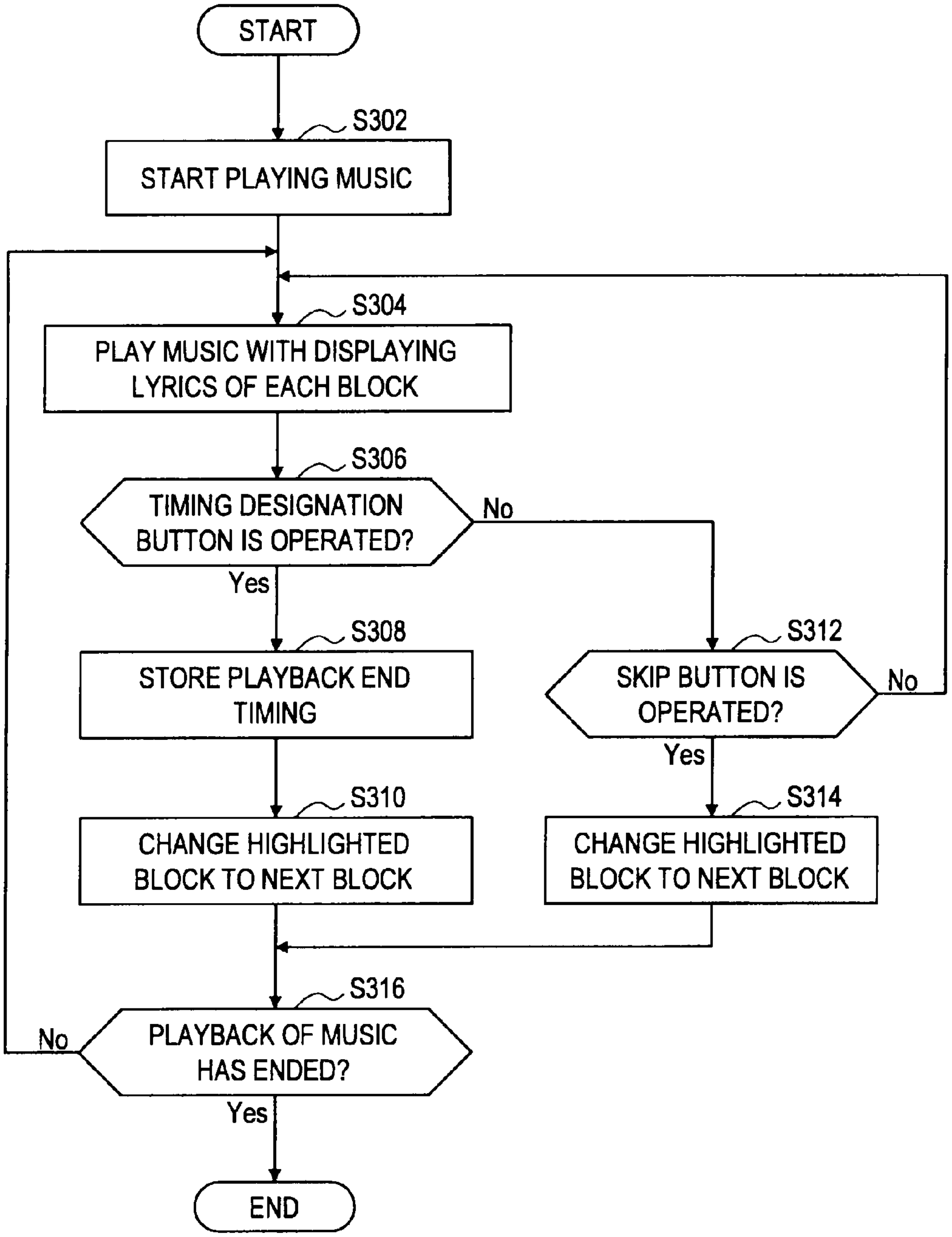
FIG. 12 is a flowchart showing an example of a flow of detection of playback end timing according to one embodiment.

FIG. 12 is a flowchart showing an example of a flow of detection of the playback end timing by the information processing device 100 in the step S102 of FIG. 10.

Referring to FIG. 12, the information processing device 100 first starts playing music in response to an instruction from a user (step S302). After that, the playback unit 120 plays the music while the display control unit 130 displays lyrics of each block on the input screen 152 (step S304). During this period, the user interface unit 140 monitors a user input.

When the timing designation button B1 is operated by a user (Yes in step S306), the user interface unit 140 stores playback end timing (step S308). Further, the display control unit 130 changes a block to be highlighted from the current target bock to the next block (step S310).

Further, when the skip button B2 is operated by a user, (No in step S306 and Yes in step S312), the display control unit 130 changes a block to be highlighted from the current target bock to the next block (step S314).

Such detection of the playback end timing is repeated until playback of the music ends (step S316). When playback of the music ends, the detection of the playback end timing by the information processing device 100 ends.

[3-4. Section Data Generation Process]

Figure 13:
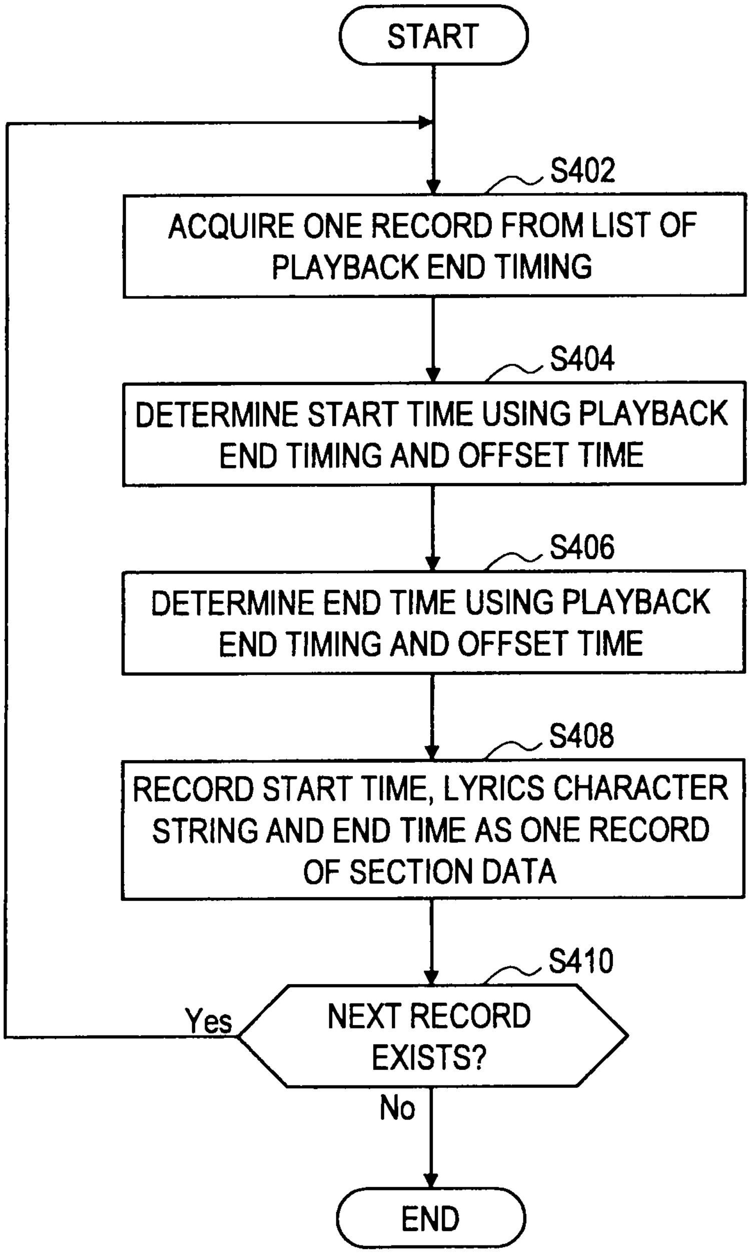
FIG. 13 is a flowchart showing an example of a flow of a section data generation process according to one embodiment.

FIG. 13 is a flowchart showing an example of a flow of the section data generation process according to the embodiment.

Referring to FIG. 13, the data generation unit 160 first acquires one record from the list of playback end timing stored by the user interface unit 140 in the process shown in FIG. 12 (step S402). The record is a record which associates one playback end timing with a block of corresponding lyrics. When skip of playback end timing has occurred, a plurality of blocks of lyrics can be associated with one playback end timing. Then, the data generation unit 160 determines start time of the corresponding section by using playback end timing and offset time contained in the acquired record (step S404). Further, the data generation unit 160 determines end time of the corresponding section by using playback end timing and offset time contained in the acquired record (step S406). After that, the data generation unit 160 records a record containing the start time determined in the step S404, the lyrics character string, and the end time determined in the step S406 as one record of the section data (step S408).

Such generation of the section data is repeated until processing for all playback end timing finishes (step S410). When there becomes no more record to be processed in the list of playback end timing, the section data generation process by the data generation unit 160 ends.

[3-5. Section Data Correction Process]

Figure 14:
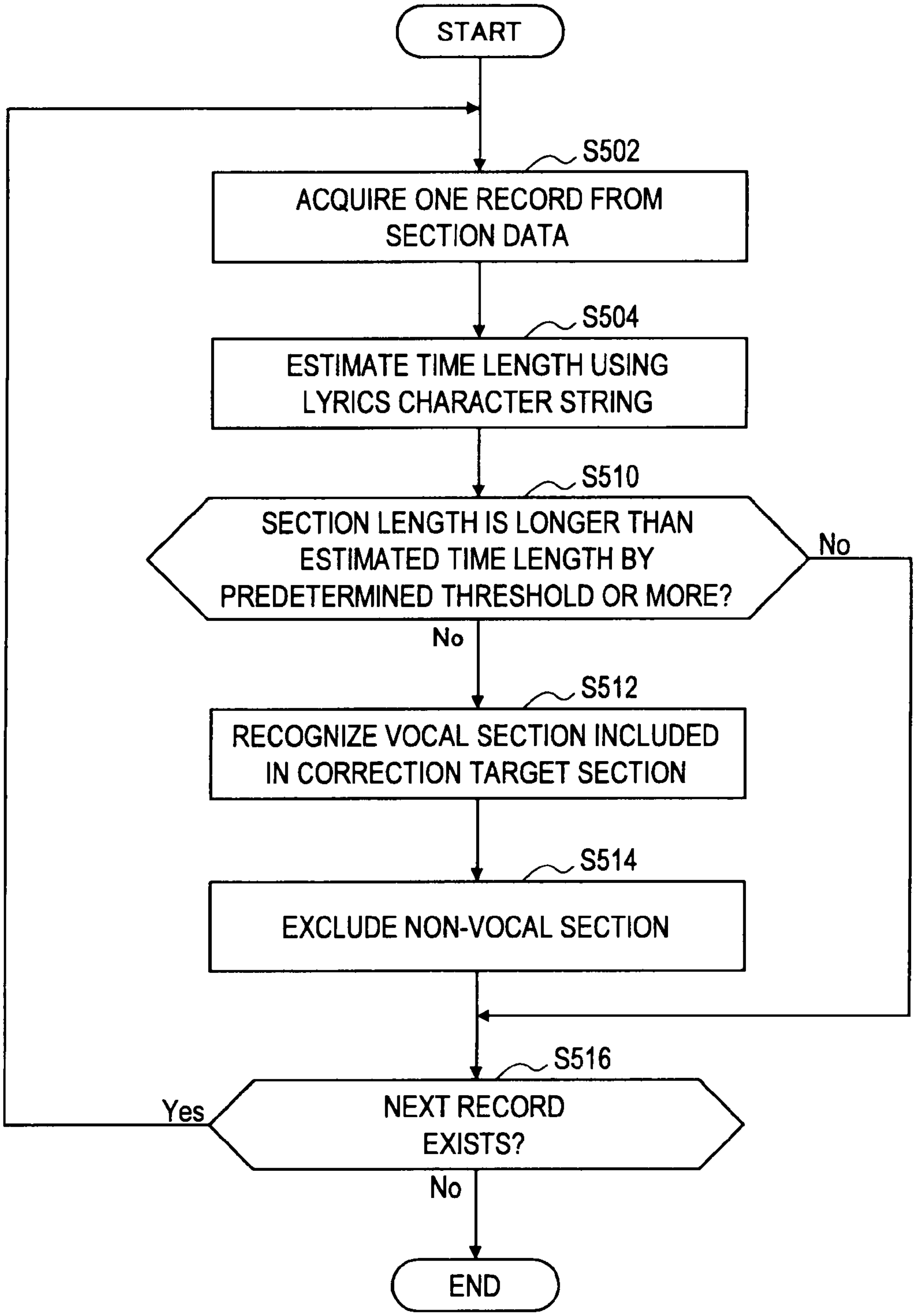
FIG. 14 is a flowchart showing an example of a flow of a section data correction process according to one embodiment.

FIG. 14 is a flowchart showing an example of a flow of the section data correction process according to the embodiment.

Referring to FIG. 14, the data correction unit 180 first acquires one record from the section data generated by the data generation unit 160 in the section data generation process shown in FIG. 13 (step S502). Next, based on a lyrics character string contained in the acquired record, the data correction unit 180 estimates a time length required to play a part corresponding to the lyrics character string (step S504). Then, the data correction unit 180 determines whether a section length in the record of the section data is longer than the estimated time length by a predetermined threshold or more (step S510). When the section length in the record of the section data is not longer than the estimated time length by a predetermined threshold or more, the subsequent processing for the section is skipped. On the other hand, when the section length in the record of the section data is longer than the estimated time length by a predetermined threshold or more, the data correction unit 180 sets the section as the correction target section and makes the analysis unit 170 recognize a vocal section included in the correction target section (step S512). Then, the data correction unit 180 corrects the start time of the correction target section to time at the head of the part recognized as being the vocal section by the analysis unit 170 to thereby exclude the non-vocal section from the correction target section (step S514).

Such correction of the section data is repeated until processing for all records of the section data finishes (step S516). When there becomes no more record to be processed in the section data, the section data correction process by the data correction unit 180 ends.

<4. Modification of Section Data by User>

By the semi-automatic alignment process described above, with the support by a user input, the information processing device 100 achieves alignment of lyrics with higher accuracy than the completely automatic lyrics alignment. Further, the input screen 152 which is provided to a user by the information processing device 100 reduces the burden of a user input. Particularly, because a user is required to designate only the timing of playback end, not playback start, of a block of lyrics, no excessive attention is required for a user. However, there still remains a possibility that the section data to be used for alignment of lyrics includes incorrect time due to causes such as wrong determination or operation by a user, or wrong recognition of a vocal section by the analysis unit 170. To address such a case, it is effective that the display control unit 130 and the user interface unit 140 provide a modification screen of section data as shown in FIG. 15, for example, to enable a user to make a posteriori modification of the section data.

Figure 15:
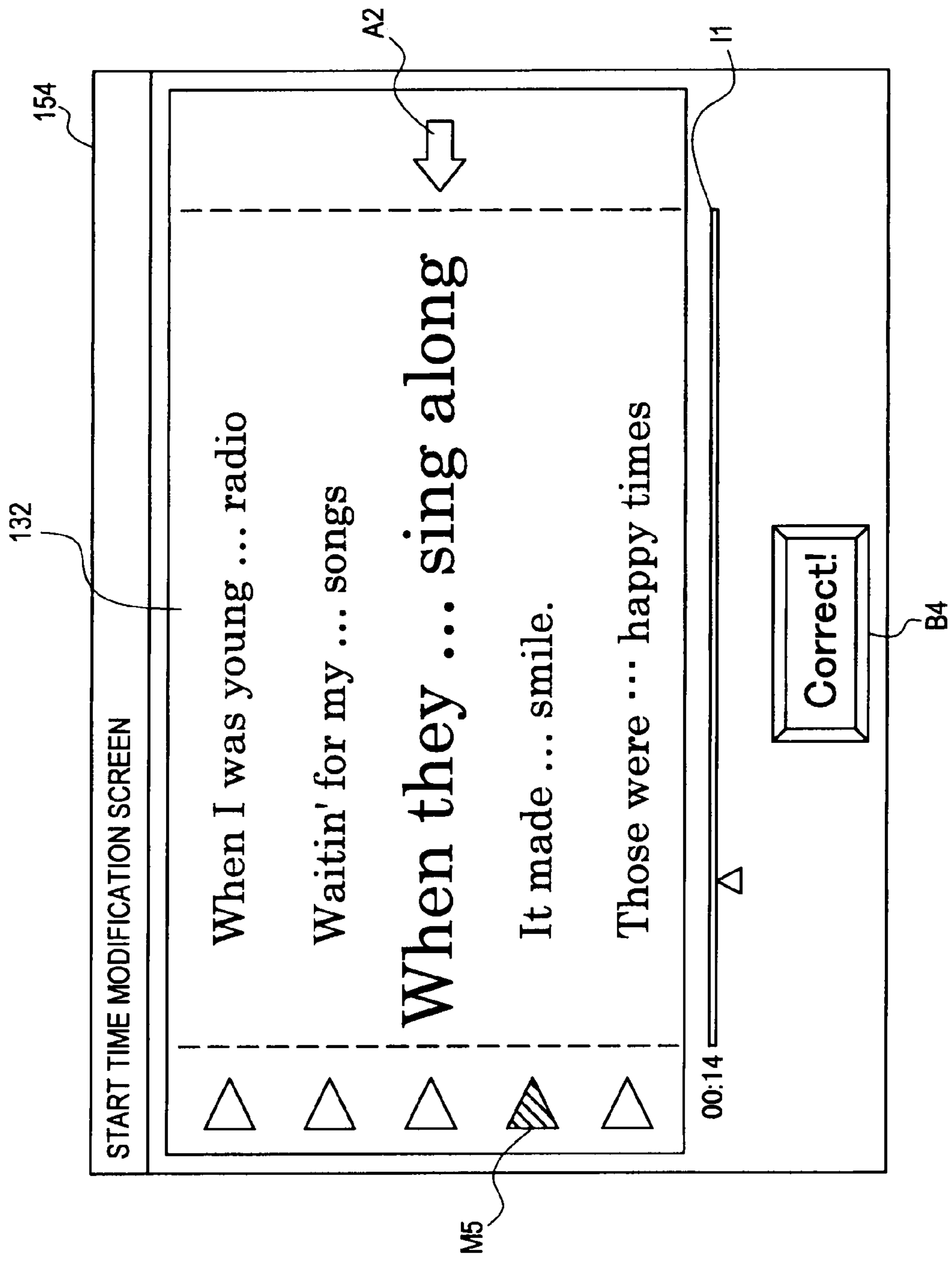
FIG. 15 is an explanatory view to explain an example of a modification screen displayed according to one embodiment.

FIG. 15 is an explanatory view to explain an example of a modification screen displayed by the information processing device 100 according to the embodiment. Referring to FIG. 15, a modification screen 154 is shown as an example. Note that, although the modification screen 154 is a screen for modifying start time of section data, a screen for modifying end time of section data may be configured in the same fashion.

At the center of the modification screen 154 is a lyrics display area 132 just like the input screen 152 illustrated in FIG. 4. The lyrics display area 132 is an area which the display control unit 130 uses to display lyrics. In the example of FIG. 4, in the lyrics display area 132, the respective blocks of lyrics included in the lyrics data are displayed in different rows. At the right of the lyrics display area 132, an arrow A2 pointing to the block being played by the playback unit 120 is displayed. Further, at the left of the lyrics display area 132, marks for a user to designate the block whose start time should be modified are displayed. For example, a mark M5 is a mark for identifying the block designated by a user as the block whose start time should be modified.

At the bottom of the modification screen 154 is a button B4. The button B4 is a time designation button for a user to designate new start time for the block whose start time should be modified out of the blocks displayed in the lyrics display area 132. For example, when a user operates the time designation button B4, the user interface unit 140 acquires new start time indicated by the timer and modifies the start time of the section data to the new start time. Note that the button B4 may be implemented using a physical button equivalent to a given key of a keyboard or a keypad, for example, rather than implemented as GUI on the modification screen 154 as in the example of FIG. 15.

<5. Modification of Alignment Data>

As described earlier with reference to FIG. 9A, alignment data generated by the alignment unit 190 is also data that associates a partial character string of lyrics with its start time and end time, just like the section data. Therefore, the modification screen 154 illustrated in FIG. 15 or the input screen 152 illustrated in FIG. 4 can be used not only for modification of the section data by a user but also for modification of the alignment data by a user. For example, when prompting a user to modify the alignment data using the modification screen 154, the display control unit 130 displays the respective labels included in the alignment data in different rows in the lyrics display area 132 of the modification screen 154. Further, the display control unit 130 highlights the label being played at each point of time with upward scrolling of the lyrics display area 132 according to the progress of playback of music. Then, a user operates the time designation button B4 at the point of time when correct timing comes for the label whose start time or end time is to be modified, for example. The start time or end time of the label included in the alignment data is thereby modified.

<6. Summary>

One embodiment of the present invention is described above with reference to FIGS. 1 to 15. According to the embodiment, while music is played by the information processing device 100, lyrics of the music are displayed on the screen in such a way that each block included in lyrics data of the music is identifiable to a user. Then, in response to a user's operation of the timing designation button, timing corresponding to a boundary of each section of the music corresponding to each block is detected. The detected timing is playback end timing of each section of the music corresponding to each block displayed on the screen. Then, according to the detected playback end timing, start time and end time of a section of the music corresponding to each block of the lyrics data are recognized. In this configuration, a user merely needs to listen to the music, giving attention only to timing to end playback of lyrics. If a user needs to give attention also to timing to start playback of lyrics, a user is required to give lots of attention (such as predicting timing to start playing lyrics, for example). Further, even if a user performs an operation after recognizing playback start timing, it is inevitable that delay occurs between the original playback start timing and detection of the operation. On the other hand, in this embodiment, because a user needs to give attention only to timing to end playback of lyrics as described above, the user's burden is reduced. Further, although delay can occur from the original playback start timing to detection of the operation, the delay only leads to a result of slightly increasing a section in section data, and no significant effect is exerted on the accuracy of alignment of lyrics for each section.

Further, according to the embodiment, the section data is corrected based on comparison between a time length of each section included in the section data and a time length estimated from a character string of lyrics corresponding to the section. Thus, when unnatural data is included in the section data generated according to a user input, the information processing device 100 modifies the unnatural data. For example, when a time length of one section included in the section data is longer than a time length estimated from a character string by a predetermined threshold or more, start time of the one section is corrected. Consequently, even when music contains a non-vocal period such as a prelude or an interlude, the section data excluding the non-vocal period is provided so that alignment of lyrics can be performed appropriately for each block of the lyrics.

Furthermore, according to the embodiment, display of lyrics of music is controlled in such a way that a block for which playback end timing is detected is identifiable to a user on an input screen. In addition, when a user misses playback end timing for a given block, the user can skip input of playback end timing on the input screen. In this case, start time of a first section and end time of a second section are associated with a character string into which lyrics character strings of the two blocks are combined. Therefore, even when input of playback end timing is skipped, the section data that allows alignment of lyrics to be performed appropriately is provided. Such a user interface further reduces the user's burden when inputting playback end timing.

Note that, in the field of speech recognition or speech synthesis, a large number of corpuses with labeled audio waveforms are prepared for analysis. Several software to label an audio waveform are provided as well. However, the quality of labeling (accuracy of positions of labels on the time axis, time resolution etc.) required in such fields is generally higher than the quality required for alignment of lyric of music. Accordingly, existing software in such fields often requires a complicated operation to a user in order to ensure the quality of labeling. On the other hand, the semi-automatic alignment in this embodiment is different from the labeling in the field of speech recognition or speech synthesis in that it places emphasis on reducing user's burden as well as maintaining a certain level of accuracy of section data.

The series of processes by the information processing device 100 described in this specification is typically implemented using software. A program composing the software that implements the series of processes may be prestored in a storage medium mounted internally or externally to the information processing device 100, for example. Then, each program is read into RAM (Random Access Memory) of the information processing device 100 and executed by a processor such as CPU (Central Processing Unit).

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-083162 filed in the Japan Patent Office on Mar. 31, 2010, the entire content of which is hereby incorporated by reference.

What is claimed is:

1. An information processing device comprising:

a storage unit that stores music data for playing music and lyrics data indicating lyrics of the music, wherein the lyrics data includes a plurality of blocks each having lyrics of at least one character;

a display control unit that displays the lyrics of the music on a screen;

a playback unit that plays the music, wherein the display control unit displays the lyrics of the music on the screen in such a way that each block included in the lyrics data is identifiable to a user while the music is played by the playback unit;

a user interface unit that detects a user input, wherein the user interface unit detects timing corresponding to a boundary of each section of the music corresponding to each displayed block in response to a first user input, and the first user input includes an active user designation of the boundary of each section of the music; and a data generation unit that generates section data indicating start time and end time of the section of the music corresponding to each block of the lyrics data according to the timing detected by the user interface unit, wherein when a time length of one section included in the section data is longer than a time length estimated from a character string of lyrics corresponding to the one section by a predetermined threshold or more, a data correction unit corrects start time of the one section of the section data.

2. The information processing device according to claim 1, wherein the timing detected by the user interface unit in response to the first user input is playback end timing for each section of the music corresponding to each displayed block.

3. The information processing device according to claim 1, wherein the data generation unit determines a start time of each section of the music by subtracting a predetermined offset time from the playback end timing.

4. The information processing device according to claim 3, wherein the data correction unit corrects the section data based on comparison between a time length of each section included in the section data generated by the data generation unit and a time length estimated from a character string of lyrics corresponding to the respective section.

5. The information processing device according to claim 4, further comprising:

an analysis unit that recognizes a vocal section included in the music by analyzing an audio signal of the music, wherein the data correction unit sets time at a head of a part recognized as being the vocal section by the analysis unit in a section whose start time should be corrected as start time after correction for the section.

6. The information processing device according to claim 1, wherein the display control unit controls display of the lyrics of the music in such a way that a block for which the playback end timing is detected by the user interface unit is identifiable to the user.

7. The information processing device according to claim 1, wherein the user interface unit detects skip of input of the playback end timing for a section of the music corresponding to a target block in response to a second user input.

8. The information processing device according to claim 7, wherein when the user interface unit detects skip of input of the playback end timing for a first section, the data generation unit associates start time of the first section and end time of a second section subsequent to the first section with a character string into which lyrics corresponding to the first section and lyrics corresponding to the second section are combined, in the section data.

9. The information processing device according to claim 1, further comprising:

an alignment unit that executes alignment of lyrics using each section and a block corresponding to the section with respect to each section indicated by the section data.

10. An information processing method using an information processing device including a storage unit that stores music data for playing music and lyrics data indicating lyrics of the music, the lyrics data including a plurality of blocks each having lyrics of at least one character, the method comprising steps of:

playing the music;

displaying the lyrics of the music on a screen in such a way that each block of the lyrics data is identifiable to a user while the music is played;

detecting timing corresponding to a boundary of each section of the music corresponding to each displayed block in response to a first user input;

generating section data indicating start time and end time of the section of the music corresponding to each block of the lyrics data according to the timing detected by the user interface unit, wherein when a time length of one section included in the section data is longer than a time length estimated from a character string of lyrics corresponding to the one section by a predetermined threshold or more, a data correction unit corrects start time of the one section of the section data, and the first user input includes an active user designation of the boundary of each section of the music.

11. A non-transitory computer readable medium storing a program which when executed causes a computer that controls an information processing device including a storage unit that stores music data for playing music and lyrics data indicating lyrics of the music, the lyrics data including a plurality of blocks each having lyrics of at least one character, to function as:

a display control unit that displays the lyrics of the music on a screen;

a playback unit that plays the music, wherein the display control unit displays the lyrics of the music on the screen in such a way that each block included in the lyrics data is identifiable to a user while the music is played by the playback unit;

a user interface unit that detects a user input, wherein the user interface unit detects timing corresponding to a boundary of each section of the music corresponding to each displayed block in response to a first user input, and the first user input includes an active user designation of the boundary of each section of the music; and a data generation unit that generates section data indicating start time and end time of the section of the music corresponding to each block of the lyrics data according to the timing detected by the user interface unit, wherein when a time length of one section included in the section data is longer than a time length estimated from a character string of lyrics corresponding to the one section by a predetermined threshold or more, a data correction unit corrects start time of the one section of the section data.

12. The information processing device according to claim 1, wherein the user interface unit includes a timing designation button which accepts the first user input.

13. The information processing device according to claim 7, wherein the user interface unit includes a skip button which accepts the second user input.

14. The information processing device according to claim 1, wherein each section of the music includes music corresponding to a plurality of characters.

15. The information processing device according to claim 1, wherein the first user input is detected after a first section of the music and before a second section of the music.

16. The information processing device according to claim 15, wherein the second section of music is played after the first section of music.

* * * * *